(12) United States Patent
Crutcher et al.

(10) Patent No.: US 6,221,822 B1
(45) Date of Patent: *Apr. 24, 2001

(54) DETERGENT COMPOSITIONS HAVING POLYALKOXYLATED AMINE FOAM STABILIZERS

(75) Inventors: Terry Crutcher, Fitchburg; James A. Krogh, Janesville, both of WI (US)

(73) Assignee: Tomah Products, Inc., Milton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,042

(22) Filed: Sep. 21, 1999

Related U.S. Application Data

(63) Continuation-in-part of application No. 08/946,163, filed on Oct. 7, 1997, now Pat. No. 5,981,458, which is a continuation-in-part of application No. 08/550,299, filed on Oct. 30, 1995, now Pat. No. 5,719,118.

(51) Int. Cl.$^7$ ................................................. C11D 01/825
(52) U.S. Cl. ..................... 510/235; 510/499; 510/503
(58) Field of Search ................................. 510/499, 503, 510/235

(56) References Cited

U.S. PATENT DOCUMENTS

| | | | |
|---|---|---|---|
| 2,572,217 | 10/1951 | Thurmond | 18/54 |
| 2,702,279 | 2/1955 | Funderburk et al. | 252/152 |
| 3,125,517 | 3/1964 | Voda | 252/8.5 |
| 3,186,946 | 6/1965 | Sluhan | 252/49.3 |
| 3,970,596 | 7/1976 | Klisch et al. | 252/546 |
| 3,983,079 | 9/1976 | Spadini et al. | 252/545 |
| 4,040,989 | 8/1977 | Renaud et al. | 252/548 |
| 4,102,826 | 7/1978 | Renaud | 252/548 |
| 4,129,508 | 12/1978 | Friihauf | 252/33 |
| 4,133,779 | 1/1979 | Hellyer et al. | 252/547 |
| 4,272,395 | 6/1981 | Wright | 252/106 |
| 4,294,728 | 10/1981 | Vanlerberghe et al. | 252/542 |
| 4,316,824 | 2/1982 | Pancheri | 252/551 |
| 4,373,054 | 2/1983 | Gibson et al. | 524/460 |
| 4,443,363 | 4/1984 | Klinger et al. | 252/547 |
| 4,492,646 | 1/1985 | Welch | 252/528 |
| 4,597,898 | 7/1986 | Vander Meer | 252/529 |
| 4,681,704 | 7/1987 | Bernardino et al. | 252/546 |
| 4,725,377 | 2/1988 | Choi | 252/174.19 |
| 4,743,395 | 5/1988 | Leifheit | 252/106 |
| 4,839,077 | 6/1989 | Cramer et al. | 252/98 |
| 4,853,148 | 8/1989 | Choi | 252/174.19 |
| 4,919,846 | 4/1990 | Nakama et al. | 252/542 |
| 5,145,608 | 9/1992 | Wershofen | 252/544 |
| 5,209,966 | 5/1993 | Lange et al. | 428/272 |
| 5,298,195 | 3/1994 | Brumbaugh | 252/547 |
| 5,565,409 | 10/1996 | Sato et al. | 504/127 |
| 5,719,118 | 2/1998 | Crutcher et al. | 510/499 |
| 5,871,590 | * 2/1999 | Hei et al. | 134/26 |
| 5,981,458 | 11/1999 | Crutcher et al. | 510/235 |

FOREIGN PATENT DOCUMENTS

| | | |
|---|---|---|
| 0 153 857 A2 | 4/1985 | (EP) . |
| 0 410 567 A2 | 1/1991 | (EP) . |
| WO 91/14693 | 3/1991 | (WO) . |
| WO 92/06161 | 9/1991 | (WO) . |

* cited by examiner

Primary Examiner—John Hardee
(74) Attorney, Agent, or Firm—Jansson, Shupe, Bridge & Munger, Ltd.

(57) ABSTRACT

The disclosure is directed to novel detergent compositions having polyalkoxylated amine foam stabilizers. The new foam stabilizers of the inventive detergent compositions build or enhance foaming and are particularly useful because of their surprisingly mild, non-skin-irritating characteristics. Mildness is a requirement of components to be included in or used in applications such as liquid dish detergents, hand cleaners and car washes.

9 Claims, No Drawings

DETERGENT COMPOSITIONS HAVING POLYALKOXYLATED AMINE FOAM STABILIZERS

RELATED APPLICATIONS

This patent application is a continuation-in-part of U.S. patent application Ser. No. 08/946,163 titled "Detergent Compositions Having Polyalkoxylated Amine Foam Stabilizers" filed Oct. 7, 1997, now U.S. Pat. No. 5,981,458, which is a continuation-in-part of U.S. patent application Ser. No. 08/550,299 titled "Detergent Compositions Having Polyalkoxylated Amine Foam Stabilizers and Method for Cleaning Including Stabilized Detergent Foam" filed Oct. 30, 1995 now U.S. Pat. No. 5,719,118.

FIELD OF THE INVENTION

This invention is related generally to detergent compositions and, more particularly, to detergent compositions with foam stabilizers including polyalkoxylated amines.

BACKGROUND OF THE INVENTION

Detergent compositions and, in particular, liquid detergent compositions are well known and widely used. Typical applications include dish detergents, hand cleaners, car washes etc. Liquid detergents have met with a high degree of acceptance primarily because of their good cleaning and convenient form for use, among other things.

Many detergent compositions, such as liquid hand dishwashing detergents, consist of two major fundamental components, a surfactant base and a foam booster. The surfactant base, which usually consists of one or more anionic and/or optionally nonionic surfactants, is largely responsible for the foam profile, i.e., initial copious foam height, volume and density, and cleaning performance of dish detergents.

Liquid dish detergents can contain specific types of surfactants which are known to be more effective at removing certain specific types of soils. For example, anionic surfactants are known for their ability to remove carbohydrate and protein type soils, while nonionic surfactants are especially useful in removal of greasy and oily food prep soils. Mixtures of surfactants are commonly used to clean and remove complex soil types which can be found on dishes and kitchen utensils.

In liquid hand dishwashing detergent compositions, consumers often associate thick and viscous products with high performance because of the natural inference that viscous products are more concentrated than non-viscous products. Thus, viscosity infers concentrated product which suggests higher quality and performance.

Additionally, for many detergent compositions, particularly liquid dish detergents, performance is normally evaluated by the consumer in terms of foaming and foam stability. The consumer associates better product performance with the presence of higher levels of foam or suds and by foam that lasts for extended periods of time even when exposed to various food preparation soils. Dish detergent compositions presently on the market are designed to remove oily/greasy soils from glasses, dishes and other tableware and kitchen utensils while maintaining an acceptable layer of foam or suds. Consequently, there is an ongoing search to make detergent compositions that clean and foam better, and produce a more stable foam.

Foam boosters, which are also known as foam stabilizers or suds enhancers are commonly used to prolong the life, i.e. existence or presence, of the foam head generated during the dishwashing process. Hand dish detergents are expected to produce copious amounts of foam in the presence of a variety of food prep soils.

Foam boosters provide the abundant long-lasting foam that consumers perceive as being directly proportional to detersive ability.

The stabilized foam head of these hand dish detergent compositions is created by agitation of the surfactant. Such detergent compositions are intended for use in manual cleaning operations and are not intended for use in automated washing processes where the copious foam produced by the agitation would interfere with the automated cleaning process.

In addition to producing abundant foam and extending foam life, foam boosters typically provide other beneficial properties to hand dish compositions. Traditionally, they are known as specialty multifunctional components. For instance, as mild surface active agents, they enhance the cleaning performance of hand dish detergents, and greatly impact the aesthetic appeal of the detergent composition through viscosity modification and emolliency. Typically, the act or process of hand washing dishes exposes one's hands to the detergent ingredients for a prolonged period of time. Therefore, great emphasis is placed on the testing and selection of mild non-irritating components. Low skin irritation as well as the overall postwashing skin condition of user's hands is a concern to commercial formulators. Detergent compositions with strong acids and bases that create pH conditions which would irritate or injure the user are not acceptable for use in hand washing operations. Further, these detergent products are intended for use at mild temperatures (i.e., in the range of 28–47° C.) which would not irritate or injure the user.

Typical foam boosters such as amine oxides, betaines, sultaines and alkanolamides have been shown to be mild ingredients and are widely used in liquid dish detergents today. Often, certain of these foam boosters exhibit solubility problems, present handling difficulties, and result in less than optimum detergent compositions.

Because of the consumer perception that certain high sudsing or foaming detergent compositions provide better cleaning, there is an ongoing search in the art to continuously improve sudsing and foaming of detergent compositions in the presence of various soils, particularly soils including carbohydrates, proteins and fats typically associated with food. Further, there is an ongoing search to provide new milder, more efficient and cost effective foam boosters.

OBJECTS OF THE INVENTION

It is an object of this invention to provide improved detergent compositions that overcome some of the problems and shortcomings of those of the prior art.

Another object of this invention is to provide detergent compositions with foam stabilizers which increase the foam production in such detergent compositions particularly for use in hand-washing operations.

It is a further object of this invention to provide improved detergent compositions with foam stabilizers which improve foam life.

Yet another object of this invention is to provide detergent compositions with foam stabilizers that are mild and non-irritating to users of the detergent compositions in which the foam stabilizer is included.

It is a further object of this invention to provide improved detergent compositions that exhibit enhanced performance characteristics such as foamability and foam stability.

An additional object is to provide detergent compositions with foam stabilizers which are particularly efficacious in removing carbohydrates, proteins, fats and other residues typically resulting from food.

These and other important objects will be apparent from the following descriptions of this invention which follow.

SUMMARY OF THE INVENTION

This invention includes novel detergent compositions having such foam stabilizers therein. It overcomes certain well known problems and deficiencies of the prior art, including those outlined above. An important aspect of this invention is the ability to provide detergent compositions which exhibit enhanced foaming, foam stability and viscosity in addition to good detergency. Such detergent compositions are useful in manual, non-automated cleaning operations because of the copious amounts of stabilized foam produced upon agitation. The excessive amounts of foam would interfere with the automated cleaning operation. For example, a liquid dish washing detergent could not be used in a laundry machine because the foam would overflow from the machine. Moreover, one skilled in the art would not look to a laundry detergent composition for use as a dish detergent because the laundry detergent art teaches removal of soil from fabric while the dish detergent art teaches the creation and production of foam in addition to the primary objective of removing food residues. Another important aspect of the invention is to provide a mild non-irritating foam stabilizer for use in detergent compositions suitable for hand application to dishes and other surfaces with improved desirable physical and chemical properties.

The invention involves a detergent composition including a surfactant base and a foam stabilizer. One form of the preferred foam stabilizer useful in the detergent composition includes a polyalkoxylated amine having the general structural formula:

$$R\text{—}R'\text{—}(CH_2CH_2CH_2)_n\text{—}N\begin{matrix}(CHCH_2O)_{\overline{x}}H \\ | \\ R'' \\ \\ R''' \\ | \\ (CHCH_2O)_{\overline{y}}H\end{matrix}$$

wherein

R is one of the group comprising: (a) an alkyl group having between 4 and 22 carbon atoms, (b) a substituted aryloxy group having between 7 and 22 carbon atoms, and (c) an alkyloxy group having between 4 and 22 carbon atoms, R' has the general structural formula:

$$\text{—}(CH\text{—}CH_2\text{—}O)_{\overline{z}}\text{—}\\ \quad | \\ \quad R^{IV}$$

wherein $R^{IV}$ is one of the group comprising: (a) hydrogen, and (b) a methyl group, and z is an integer from 0–7, R" is one of the group comprising: (a) hydrogen and, (b) a methyl group, R''' is one of the group comprising: (a) hydrogen and, (b) a methyl group, n is 0 or 1, x is an integer from 1–20, and y is an integer from 1–20, such that x+y is greater than 3 but less than or equal to 20.

In one embodiment, the detergent composition includes a foam stabilizer wherein the polyalkoxylated amine is a first constituent, and the foam stabilizer further comprises a second constituent. This second constituent can include a polyalkoxylated amine having the general structural formula:

$$R\text{—}R'\text{—}\left(CH_2CH_2CH_2N\begin{matrix}(CH\text{—}CH_2\text{—}O)_{\overline{w}}H \\ | \\ R^V\end{matrix}\right)_m\text{—}CH_2CH_2CH_2N\begin{matrix}(CHCH_2O)_{\overline{x}}H \\ | \\ R'' \\ \\ R''' \\ | \\ (CH\text{—}CH_2O)_{\overline{y}}H\end{matrix}$$

wherein

R is one of the group comprising: (a) an alkyl group having between 4 and 22 carbon atoms, (b) a substituted aryloxy group having between 7 and 22 carbon atoms, and (c) and alkyloxy group having between 4 and 22 carbon atoms, R' has the general structural formula:

$$\text{—}(CH\text{—}CH_2\text{—}O)_{\overline{z}}\text{—}\\ \quad | \\ \quad R^{IV}$$

wherein $R^{IV}$ is one of the group comprising: (a) hydrogen, and (b) a methyl group; and z is an integer from 0–7, R" is one of the group comprising: (a) hydrogen and, (b) a methyl group;

R''' is one of the group comprising: (a) hydrogen and, (b) a methyl group;

$R^V$ is one of the group comprising: (a) hydrogen and, (b) a methyl group;

m is equal to 1 or 2, w is an integer from 0–20, x is an integer from 0–20, and y is an integer from 0–20, such that w+x+y is greater than 2 but less than or equal to 20, wherein the polyalkoxylated amine of the second constituent differs from the polyalkoxylated amine of the first constituent.

Alternatively, the second constituent can be selected from the group including: a) amine oxides; b) betaines; c) alkanolamides; and d) sultaines. In such an embodiment, the first constituent is about 1–99% of the foam stabilizer and the second constituent is 99–1% of the foam stabilizer.

The composition typically includes about 10–50% surfactant base and about 1–15% foam stabilizer. Preferably, the foam stabilizer is about 3–10% of the composition. Highly preferred detergent compositions include about 5–8% foam stabilizer. Further, the detergent composition can include a hydrotrope and diluent.

An alternative detergent composition encompassing the present invention includes a surfactant base and a foam stabilizer including a polyalkoxylated amine having the general structural formula:

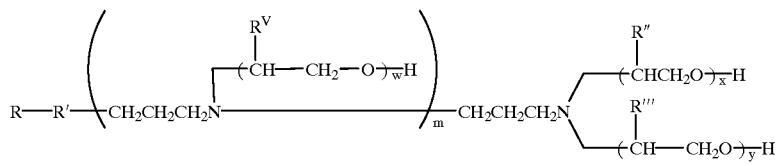

wherein
R is one of the group comprising: (a) an alkyl group having between 4 and 22 carbon atoms, (b) a substituted aryloxy group having between 7 and 22 carbon atoms, and (c) and alkyloxy group having between 4 and 22 carbon atoms,
R' has the general structural formula:

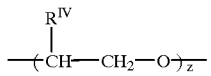

wherein $R^{IV}$ is one of the group comprising: (a) hydrogen, and (b) a methyl group; and z is an integer from 0–7,
R" is one of the group comprising: (a) hydrogen and, (b) a methyl group;
R''' is one of the group comprising: (a) hydrogen and, (b) a methyl group;
$R^V$ is one of the group comprising: (a) hydrogen and, (b) a methyl group;
m is equal to 1 or 2,
w is an integer from 0–20,
x is an integer from 0–20, and
y is an integer from 0–20,
such that w+x+y is greater than 2 but less than or equal to 20, Again, this detergent composition can include a foam stabilizer wherein the polyalkoxylated amine is a first constituent, and the foam stabilizer further comprises a second constituent. Preferably, the second constituent is selected from the group including: a) amine oxides; b) betaines; c) alkanolamides; and d) sultaines. Typically, the first constituent is about 1–99% of the foam stabilizer and the second constituent is about 99–1% of the foam stabilizer.

In one embodiment, the composition includes about 10–50% surfactant base and about 1–15% foam stabilizer. Preferably, the foam stabilizer is about 3–10% of the composition. Highly preferred detergent compositions include about 5–8% foam stabilizer. Additionally, the detergent compositions can further include a hydrotrope and diluent.

Preferred embodiments of the detergent compositions include foam stabilizers that are non-corrosive, mild, foam enhancing, foam stabilizers such that a user's hands, after submersion in a solution containing the detergent composition, are not irritated.

DETAILED DESCRIPTIONS OF THE PREFERRED EMBODIMENTS

The present invention is directed to detergent compositions with foam stabilizers. Such foam stabilized detergent compositions have improved foam production, foam stability, and detergency. In particular, such foam stabilizers are particularly useful in liquid dish detergent compositions and other detergents suitable for hand application where large amounts of foam are desirable. While liquid detergent compositions are preferred, the invention can include detergents in the solid state, the manufacture of which would be known to those of skill in the art.

It is envisioned that the inventive compositions will be most useful in dish washing applications. However, it is intended that the invention may be used in other manual cleaning applications such as hand washing of automobiles and other hard surfaces. Again, generation of stabilized foam in these manual cleaning applications does not interfere with the cleaning operation and is perceived by the user as a benefit.

Generally, liquid dish detergent compositions include a surfactant base system (surfactant base) and foam stabilizers or boosters and diluents. Optionally, hydrotropes and other additives or adjuvants known to one of ordinary skill in the art that affect, for instance, the aesthetics, shelf-life, etc. of the composition can also be included.

The surfactant base of these compositions primarily contributes to cleaning and foaming. The surfactant base may comprise about 10–50% of the detergent composition. Preferably, the surfactant base is about 20–40% of the detergent composition. In highly preferred embodiments, the surfactant base is about 25–35% of the detergent composition.

The surfactant base of the detergent compositions can include a single primary surfactant or a mixture of both primary and secondary surfactants. The surfactants are typically selected for their ability to contribute to foam production and to remove residues associated with food rather than with clay soils. The surfactants are selected to be compatible with manual cleaning applications since the foam generated during their use and agitation could not typically be contained within an automated mechanical closed system such as laundry or washing machine with a closed lid.

Typically, the primary surfactants are high foaming anionic surfactants. Any number of surfactants can be used in the detergent compositions of the present invention. The most common anionic surfactants include: an organic sulfate or sulfonate surfactant, preferably selected from $C_{11}$–$C_{15}$ alkyl benzene sulfonates, $C_{10}$–$C_{16}$ alkyl sulfates and their ethoxy analogues containing up to twelve moles of ethylene oxide per mole of alkyl ethoxy sulfates, $C_{13}$–$C_{18}$ paraffin sulfonates $C_{10}$–$C_{16}$ olefin sulfonates, $C_{10}$–$C_{20}$ alkyl glyceryl ether sulfonates, $C_9$–$C_{17}$ acyl-N—($C_1$–$C_4$ alkyl) or —N—($C_2$–$C_4$ hydroxyalkyl) glucamine sulfates, and mixtures of any of the foregoing.

More preferably the anionic surfactant is selected from linear alkyl benzene sulfonates, alkyl ethoxy sulfates, alkyl glyceryl ether sulfonates and paraffin sulfonates.

Alkyl benzene sulfonates useful in compositions of the present invention are those in which the alkyl group which is substantially linear, contains 1–16 carbon atoms, preferably 10–13 carbon atoms, a material with an average carbon chain length of 11.2 being most preferred. The phenyl isomer distribution, i.e., the point of attachment of the alkyl chain to the benzene nucleus, is not critical, but alkyl benzenes having a high 2-phenyl isomer content are preferred. Examples of suitable alkyl benzene sulfonates include Bio-Solf D-62, sold by Stepan Co.

Suitable alkyl sulfates are primary alkyl sulfates in which the alkyl group contains 1–16 carbon atoms, more preferably an average of 12–14 carbon atoms preferably in a linear chain. $C_{10}$–$C_{16}$ alcohols, derived from natural fats, or Ziegler olefin build-up, or OXO synthesis, form suitable sources for the alkyl group. Examples of synthetically derived materials include Dobanol 23 (RTM), sold by Shell Chemicals (UK) Ltd., Ethyl 24 sold by the Ethyl Corporation, a blend of $C_{13}$–$C_{15}$ alcohols in the ratio 67% $C_{13}$, 33% $C_{15}$ sold under the trade name Lutensol by BASF GmbH and Synperonic (RTM) by ICI Ltd., and Lial 125 sold by Liquichimica Italiana. Examples of naturally occurring materials from which the alcohols can be derived are coconut oil and palm kernel oil and the corresponding fatty acids.

Alkyl ethoxy sulfate surfactants comprise a primary alkyl ethoxy sulfate derived from the condensation product of an alcohol with an average of up to 6 ethylene oxide groups. The $C_{10}$–$C_{16}$ alcohol itself can be obtained from any of the sources previously described for the alkyl sulfate component. $C_{12}$–$C_{14}$ alkyl ethoxy sulfates are preferred. Examples of suitable alkyl ethoxy sulfates include Steol CS-460, available from Stepan Co.

Conventional base-catalyzed ethoxylation processes to produce an average degree of ethoxylation of 12 result in a distribution of individual ethoxylates ranging from 1 to 15 ethoxy groups per mole of alcohol, so that the desired average can be obtained in a variety of ways. Blends can be made of material having different degrees of ethoxylation and/or different ethoxylate distributions arising from the specific ethoxylation techniques employed and subsequent processing steps such as distillation. For example, it has been found that sudsing and grease removal performance equivalent to that given by a blend of alkyl sulfate and alkyl triethoxy sulfate can be obtained by reducing the level of alkyl sulfate and using an alkyl ethoxy sulfate with an average of approximately two ethoxy groups per mole of alcohol. In preferred compositions in accordance with the present invention an alkyl ethoxy sulfate is used which has an average degree of ethoxylation of from 0.4 to 5, more preferably from 2.0 to 4.0.

Paraffin sulfonates useful in the present invention have from 13 to 18 carbon atoms per molecule, more desirably 13 to 16 carbon atoms per molecule. These sulfonates are preferably prepared by subjecting a cut of paraffin, corresponding to the chain lengths specific above, to the action of sulfur dioxide and oxygen in accordance with the well-known sulfoxidation process. The product of this reaction is a secondary sulfonic acid which is then neutralized with a suitable base to provide a water-soluble secondary alkyl sulfonate. Similar secondary alkyl sulfonates may be obtained by other methods, e.g., by the sulfochlorination method in which chlorine and sulfur dioxide are reacted with paraffins in the presence of actinic light, the resulting sulfonyl chlorides being hydrolyzed and neutralized to form the secondary alkyl sulfonates. Whatever technique is employed, it is normally desirable to produce the sulfonate as the monosulfonate, having no unreacted starting hydrocarbon or having only a limited proportion thereof present and with little or no inorganic salt by-product. Similarly, the proportions of disulfonate or higher sulfonated materials will be minimized, although some may be present. The monosulfonate may be terminally sulfonated or the sulfonate group may be joined on the 2-carbon or other carbon of the linear chain. Similarly, any accompanying disulfonate, usually produced when an excess of sulfonating agent is present, may have the sulfonate groups distributed over different carbon atoms of the paraffin base, and mixtures of the monosulfonates and disulfonates may be present.

Mixtures of monoalkane sulfonates wherein the alkanes are of 14 and 15 carbon atoms are particularly preferred wherein the sulfonates are present in the weight ratio of $C_{14}$–$C_1$ paraffins in the range from 1:3 to 3:1.

Olefin sulfonates useful in the present invention are mixtures of alkene-1-sulfonates, alkene hydroxysulfonates, alkene disulfonates and hydroxydisulfonates, and are described in U.S. Pat. No. 3,332,800, issued to P. F. Pflauner and A. Kessler on Jul. 25, 1967.

Suitable alkyl glyceryl ether sulfonates are those derived from ethers of coconut oil and tallow.

Other sulfate surfactants include the $C_9$–$C_{17}$ acyl-N—($C_1$–$C_4$ alkyl) or —N—($C_1$–$C_2$ hydroxyalkyl) glucamine sulfates, preferably those in which the $C_9$–$C_{17}$ acyl group is derived from coconut or palm kernel oil. These materials can be prepared by the method disclosed in U.S. Pat. No. 2,717,894, issued Sep. 13, 1955 to Schwartz.

The counterion for the anionic surfactant component is preferably selected from sodium, potassium, magnesium, ammonium or alkanol-ammonium, and mixtures thereof.

The secondary surfactants of the base surfactant system of the detergent composition are selected from: (a) anionic surfactants, including those discussed previously; and (b) nonionic surfactants. Suitable nonionic surfactants include:

1) The polyethylene, polypropylene, and polybutylene oxide condensates of alkyl phenols. In general, the polyethylene oxide condensates are preferred. These compounds include the condensation products of alkyl phenols having a methyl group containing from about 6 to about 12 carbon atoms in either a straight chain or branched chain configuration with the alkylene oxide. In a preferred embodiment, the ethylene oxide is present in an amount equal to from about 2 to about 25 moles of ethylene oxide per mole of alkyl phenol. Commercially available nonionic surfactants of this type include Igepal™ CO-630, marketed by the GAF Corporation; and Triton™ X-45, X114, X100 and X102, all marketed by the Rohm & Haas Company.

2) The alkyl ethoxylate condensation products of aliphatic alcohols with from about I to about 25 moles of ethylene oxide. The alkyl chain of the aliphatic alcohol can either be straight or branched, primary or secondary, and generally contains from 8 to 22 carbon atoms. Particularly preferred are the condensation products of alcohols having a methyl group containing from 10 to 20 carbon atoms with from about 2 to about 10 moles of ethylene oxide per mole of alcohol. Most preferred are the condensation products of alcohols having a methyl group containing from 10 to 14 carbon atoms with from about 6 to about 10 moles of ethylene oxide per mole of alcohol. Examples of commercially available nonionic surfactants of this type include Tergitol™ 15-S-9 (the condensation product of $C_{11}$–$C_{15}$ linear alcohol with 9 moles ethylene oxide), Tergitol™ 24-L-6 NMW (the condensation product of $C_{12}$–$C_{14}$ primary alcohol with 6 moles ethylene oxide with a narrow molecular weight distribution), both marketed by Union Carbide Corporation; Neodol™ 45-9 (the condensation product of $C_{14}$–$C_{15}$ linear alcohol with 9 moles of ethylene oxide), Neodol™ 23-6.5 (the condensation product of $C_{12}$–$C_{13}$ linear alcohol with 6.5 moles of ethylene oxide), Neodol™ 45-7 (the condensation product of $C_{14}$–$C_{15}$ linear alcohol with 7 moles of ethylene oxide), Neodol™ 45-4 (the condensation product of $C_{14}$–$C_{15}$ linear alcohol with 4 moles of ethylene oxide), marketed by Shell Chemical Company, and Kyro™ EOB (the condensation product of $C_{13}$–$C_{15}$ alcohol with 9 moles ethylene oxide), marketed by The Procter & Gamble Company.

3) The condensation products of ethylene oxide with a hydrophobic base formed by the condensation of propylene oxide with propylene glycol. The hydrophobic portion of these compounds preferably has a molecular weight of from about 1500 to about 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially-available Pluronic™ surfactants, marketed by BASF.

4) The condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic™ compounds, marketed by BASF.

5) Alkylpolysaccharides disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. (Optionally, the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

The preferred alkypolyglycosides have the formula:

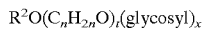
$R^2O(C_nH_{2n}O)_t(glycosyl)_x$ wherein $R^2$ is selected from the group consisting of alkyl, alkylphenyl, hydroxylakyl, hydroxyalkylphenyl, and mixtures thereof in which the alkyl groups contain from 10 to 18, preferably from 12 to 14, carbon atoms; n is 2 or 3, preferably 2; t is from 0 to about 10, preferably 0; and x is from about 1:3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

Additionally, numerous other surfactants are known and suitable for use in the composition of the present invention. A variety of these can be found in *McCutcheon's Emulsifiers and Detergents,* 1994 and *The Handbook of Industrial Surfactants,* by Gower Publishing Company, 1993.

The components of the surfactant base are selected on the following basis: price, performance, component compatibility, soil and detergent conditions, and/or the type of formula under development. The surfactant base may vary depending on the desired performance characteristic such as mildness, grease cutting, skin sensitivity, or antimicrobial activity of a formula.

The surfactant base is selected for use in manual, hand application settings. The copious foam generated on agitation of the composition would interfere with automated cleaning processes.

Foam boosters or foam stabilizers are included in detergent compositions to enhance the foam quantity, quality, and the foam lastingness. Additionally, foam boosters or stabilizers provide additional benefits to the detergent composition such as emolliency, detergency, etc. For instance, the feel of a users hands after, for example, using hand dish detergents or hand soaps may be affected by the foam boosters or stabilizers. Thus, foam production and foam life are not the only considerations when choosing the foam booster or stabilizer. Affect on the user is also an important consideration.

Care in selection of foam stabilizers must be exercised, because while some substances produce abundant levels of foam and extended foam life, these same substances can adversely affect the user's hands. In particular, where the user immerses his or her hands in a solution containing the detergent composition, corrosivity or irritation concerns arise. Care must be taken to utilize foam boosters or stabilizers that are not themselves corrosive or skin irritants and do not contribute significantly to the corrosivity of the composition. A "Toxicity Category Label (TCL)" is a standard for determining irritancy accepted by the United States Environmental Protection Agency (US EPA). Within this system of evaluation, products are ranked on a scale of 1–4: 1-Corrosive, 2-Severe Irritant, 3-Moderate Irritant and 4-Mild\Slight Irritant. The preferred polyalkoxylated amines of the present invention should, when subject to testing related to this TCL, produce a rating score of 4 indicating their mildness. The presence of strong acids, strong bases or other materials which would irritate or injure the user's hands are incompatible with the present invention. Further, since avoidance of skin injury and irritation is an important object of the invention, it is envisioned that the inventive composition would be used at mild temperatures typically in the range of 28–47° C.

Foam stabilizers are about 1–15% of the detergent composition. Preferably, the detergent composition includes about 3–10% foam stabilizer. In highly preferred embodiments, the foam stabilizer is about 5–8% of the detergent composition.

Several possible foam stabilizers have been found suitable for use in the detergent compositions. The foam stabilizers of the present invention preferably include a polyalkoxylated amine having the general structural formula:

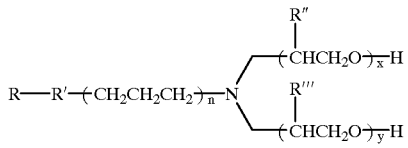

wherein
R is one of the group comprising: (a) an alkyl group having between 4 and 22 carbon atoms, (b) a substituted aryloxy group having between 7 and 22 carbon atoms, and (c) an alkyloxy group having between 4 and 22 carbon atoms,
R' has the general structural formula:

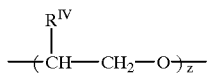

wherein $R^{IV}$ is one of the group comprising: (a) hydrogen, and (b) a methyl group; and z is an integer from 0–7,
R" is one of the group comprising: (a) hydrogen and, (b) a methyl group;
R'" is one of the group comprising: (a) hydrogen and, (b) a methyl group;
n is 0 or 1,
x is an integer from 1–20, and
y is an integer from 1–20,
such that x+y is greater than 3 but less than or equal to 20.
Preferably, R includes 6 to 14 carbon atoms. In highly preferred embodiments, R includes 10 to 14 carbon atoms. Further, it is preferred that x+y is greater than or equal to 4 and less than or equal to 10. Highly preferred embodiments are such that x+y is greater than or equal to 5 and less than or equal to 7.

Alternatively, the foam stabilizers of the present invention can include a polyalkoxylated amine having the general structural formula:

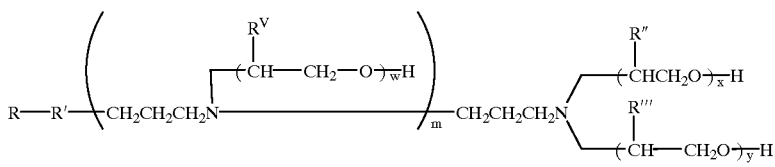

wherein
R is one of the group comprising: (a) an alkyl group having between 4 and 22 carbon atoms, (b) a substituted aryloxy group having between 7 and 22 carbon atoms, and (c) and alkyloxy group having between 4 and 22 carbon atoms, R' has the general structural formula:

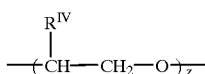

wherein $R^{IV}$ is one of the group comprising: (a) hydrogen, and (b) a methyl group; and z is an integer from 0–7,
R" is one of the group comprising: (a) hydrogen and, (b) a methyl group;
R'" is one of the group comprising: (a) hydrogen and, (b) a methyl group;
$R^V$ is one of the group comprising: (a) hydrogen and, (b) a methyl group;
m is equal to 1 or 2,
w is an integer from 0–20,
x is an integer from 0–20, and
y is an integer from 0–20,
such that w+x+y is greater than 2 but less than or equal to 20, In these types of foam stabilizers, it is preferable that m is equal to 1 and z is equal to zero. Additionally, R preferably includes 6 to 14 carbon atoms. R includes 10 to 14 carbon atoms in highly preferred embodiments. Further, it is preferable that w+x+y is greater than or equal to 4 and less than or equal to 10. In highly preferred embodiments, w+x+y is greater than or equal to 5 and less than or equal to 7.

The foam stabilizers of the present invention can include the polyalkoxylated amine constituent alone or can include other constituents. These other constituents can include other polyalkoxylated amines. Additionally, these other constituents can be selected from the group including: a) amine oxides; b) betaines; c) alkanolamides; and d) sultaines.

Amine oxides useful in the present invention include those compounds having the formula:

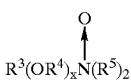

wherein $R^3$ is selected from an alkyl, hydroxyalkyl, acylamidopropyl and alkyl phenyl group, or mixtures thereof, containing from 8 to 26 carbon atoms, preferably 8 to 16 carbon atoms; $R^4$ is an alkylene or hydroxyalkylene group containing from 2 to 3 carbon atoms, preferably 2 carbon atoms, or mixtures thereof; x is from 0 to 3, preferably 0; and each $R^5$ is an alkyl or hydroxyalkyl group containing from 1 to 3, preferably from I to 2 carbon atoms, or a polyethylene oxide group containing from I to 3, preferably 1, ethylene oxide groups, the $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide and dimethyl-2-hydroxyoctadecylamine oxide. Preferred are $C_{10}$–$C_{18}$ alkyl dimethylamine oxide, $C_{10}$–$C_{18}$, acylamido alkyl dimethylamine oxide, and polyethoxylated (4–10 mols) $C_8$–$C_{13}$ alkyloxypropylamine oxides such as "AO-14-2", available from Tomah Products, Inc., of Milton, Wis.

The betaines useful in the present invention are those compounds having the formula $R(R^1)_2N^+R^2COO-$ wherein R is a $C_6$–$C_{18}$ (alkyl) group, preferably a $C_{10}$–$C_{16}$ alkyl group, each $R^1$ is typically $C_1$–$C_3$ alkyl, preferably methyl, and $R^2$ is a $C_1$–$C_5$ alkyl group, preferably a $C_1$–$C_3$ alkylene group, more preferably a $C_1$–$C_2$ alkylene group. Examples of suitable betaines include coconut acylamidopropyldimethyl betaine; hexadecyl dimethyl betaine; $C_{12}$–$C_{14}$ acylamidopropylbetaine; $C_{8-14}$ acylamidohexyldiethyl betaine; 4[$C_{14-16}$ acylmethylamidodiethylammonio]-1-carboxybutane; $C_{14-16}$ acylamidopentanediethylbetaine; [$C_{12-16}$ acylmethylamidodimethylbetaine. Preferred betaines are $C_{12-18}$ dimethyl-ammonio hexanoate and the $C_{10-18}$ acylamidopropane (or ethane) dimethyl (or diethyl) betaines.

The sultaines useful in the present invention are those compounds having the formula $R(R^1)_2N^+R^2SO_3-$ wherein R is a $C_6$–$C_{18}$ alkyl group, preferably a $C_{10}$–$C_{16}$ alkyl group, more preferably a $C_{12}$–$C_{13}$ alkyl group, each $R^1$ is typically $C_1$–$C_3$, preferably methyl, and $R^2$ is a $C_1$–$C_6$ alkyl group, preferably a $C_1$–$C_3$ alkylene or, preferably, hydroxyalkylene group. Examples of suitable sultaines include $C_{12-14}$ dimethylammonio-2 hydroxypropyl sulfonate, $C_{12-14}$ amido propyl ammonio-2-hydroxypropyl sultaine, $C_{12-4}$ dihydroxyethylammonio propane sulfonate, and $C_{16-18}$ dimethylammonio hexane sulfonate, with $C_{12-14}$ amido propyl ammonio-2-hydroxypropyl sultaine being preferred.

Alkanolamides useful in the foam stabilizer include linear, mono- and di-alkanolamides having the general structural formula:

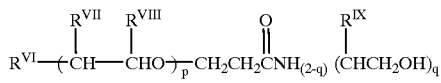

wherein $R^{VI}$ is an alkyl group having at least 6 carbon atoms, or an alkyloxy group having at least 6 carbon atoms, $R^{VII}$ is one of the group comprising: a) hydrogen, b) an alkyl group having between 1 and 20 carbon atoms, and c) a benzene ring, $R^{VIII}$ is one of the group comprising: a) hydrogen and b) an alkyl group having between 1 and 4 carbon atoms, $R^{IX}$ is one of the group comprising: a) hydrogen and b) an alkyl group having between 1 and 4 carbon atoms, p is an integer from 0–00, and q is an integer from 1–2.

It has been found particularly useful to utilize ether alkanolamides with the polyalkoxylated amines as a foam stabilizer.

Where the foam stabilizer includes a first constituent which is a polyalkoxylated amine and a second constituent, the foam stabilizer can include about 1–99% of the first constituent and about 99–1% of the second constituent. In preferred embodiments, the first constituent is about 25–75% of the foam stabilizer and the second constituent is about 75–25% of the foam stabilizer. Highly preferred multi-constituent foam stabilizers include about 40–60% of the first constituent and about 60–40% of the second constituent.

Additionally, the foam stabilizer can include more than two constituents. One of ordinary skill in the art could combine the disclosed polyalkoxylated amines with any number of other constituents to provide a useful foam stabilizer, including other polyalkoxylated amines.

Preferably, the polyalkoxylated amine foam stabilizers are non-corrosive, mild, foam enhancing, foam stabilizers such that a user's hands, after submersion in a solution containing the foam stabilizer, are not irritated.

Typically, tertiary amines are considered to be highly basic and corrosive to the skin. Additionally, such aliphatic tertiary amines with fewer than 4 polyalkoxylated groups tend to be more oil than water soluble. The solubility associated with these oil soluble analogs lessen their utility in liquid formulations. Further, tertiary amines tend to react with organic acids to form insoluble ionic complexes due to the nature of the basic nitrogen. Unfortunately, dodecylbenzene sulfonic acid (DDBSA) is a common constituent in many liquid dish detergent compositions. The solubility, formulatability and perceived corrosivity problems of these polyalkoxylated surfactants, have previously made it undesirable to attempt to formulate isotropic thermodynamically stable high-foaming hand dish compositions containing both constituents.

However, the polyalkoxylated amines of the present invention provide an avenue by which the above-mentioned problems can be overcome. The polyalkoxylated amines of the present invention do not exhibit the typical corrosivity and solubility properties of the broader class of tertiary amines. In particular, it has been found through extensive experimentation that when the nitrogen of the inventive amines is sufficiently polyalkoxylated, the polyalkoxylated groups sterically hinder the reactivity of the basic nitrogen. This results in a less basic, low HLB tertiary amine which exhibits physical and chemical properties characteristic of nonionic surfactants, while still maintaining the desirable properties of amines. Particularly, it has been found that when the extent of alkoxylation is at 4 and above, i.e. the polyalkoxylated amine contains 4 or more alkoxylated groups, the amines tend to be more water soluble than oil soluble. As the extent of alkoxylation increases, the foam boosting potential of the polyalkoxylated amines diminishes to a point where foam boosting potential is lost. In particular, at about 9 alkoxylated groups, foam boosting potential is severely limited. In fact, these higher polyalkoxylated amines tend to be used in applications where foam boosting is not a desired attribute, such as in automatic dish detergent compositions. Thus, the preferred polyalkoxylated amines of the present invention should involve at least 4 and less than 9 alkoxylated groups, for optimum performance. Preferably, the polyalkoxylated amines include 5 to 7 alkoxylated groups.

COMPARISON TESTS

Example 1

To test the comparative performance properties of the foam stabilizers of the present invention, the inventive foam stabilizers were incorporated into liquid hand dish compositions and compared to a formulation containing prior art foam booster. A typical miniplate test according to ASTM Designation D 4009-81 was used to compare the performance of the following molecules. The test conditions included compositions with pH values of about 7 and mild water temperatures in the range of about 28–47° C. The results of the performance evaluation are reported in terms of the number of plates each detergent composition washed. A single plate difference in the examples represents a significant difference in the data. The comparative study was constructed around the framework of a basic dish detergent composition containing the following components:

| Constituent | Weight % |
| --- | --- |
| Dodecylbenzene sulfonate, sodium salt | 20 |
| Lauryl (4 mol) ethoxyether sulfate, sodium salt | 15 |
| Sodium xylene sulfonate | 3.0 |
| Ethanol | 2 |
| Foam Stabilizer (Equal active Basis) | 5 |
| Water | Balance |
| Foam Stabilizer | Number of Plates Washed |
| Polyethoxylated (2) n-dodecyl, pentadecyloxypropylamine | 8 |
| Polyethoxylated (3) tallow, 1,3 diaminopropane | 7 |
| Polyethoxylated (2) tallow amine | 6 |
| Polypropoxylated (5) tallow amine | 7 |
| Polyethoxylated (2) n-octadecyl-oxypropylamine | 9 |
| Polyethoxylated (2) isodecyloxy-propylamine | 9 |
| Polyethoxylated (2) n-dodecyl, tetradecyloxypropylamine | 9 |
| Polyethoxylated (5) isodecyloxy-propylamine | 10 |
| Polyethoxylated (5) n-dodecyl, tetradecyloxypropylamine | 11 |
| Polyethoxylated (2) coco amine | 8 |
| Polyethoxylated (2) isohexyoxy-propylamine | 9 |
| Polyethoxylated (5) isostridecyl-oxypropylamine | 10 |
| Polyethoxylated (3) n-dedecyl, tetradecyloxypropyl 1,3 diaminopropane | 8 |
| Polyethoxylated (2) isotridecyl-oxypropylamine | 8 |
| Polyethoxylated (2) soya amine | 6 |
| Coco diethanolamide (prior art) | 8 |

As can be seen, several of the polyalkoxylated amine foam stabilizers provided comparable or better results compared to the prior art foam booster.

Example 2

To evaluate the performance of the inventive foam stabilizers with a surfactant base that includes both anionic and nonionic surfactants, a comparative analysis was done using a base formulation that included anionic surfactants as found in Test A and a surfactant base which included both anionic and nonionic surfactants as evaluated in Test B.

| Base Formulation | Weight % |
| --- | --- |
| Test #A | |
| Water | 60 |
| Dodecylbenzene Sulfonate, sodium salt | 22.5 |
| Lauryl (4 mol) ethoxyether sulfate, sodium salt | 7.5 |
| Ethyl Alcohol | 4 |
| Polyethoxylated (5) isododecyloxypropylamine/ coco diethanolamide (50:50) | 6 |
| Number of plates washed = 16 | |
| Test #B | |
| Water | 60 |
| Dodecylbenzene Sulfonate, sodium salt | 22.5 |
| Decyl-hexadecyl polygycoside | 7.5 |
| Ethyl Alcohol | 4 |
| Polyethoxylated (5) isododecyloxypropylamine/ coco diethanolamide (50:50) | 6 |
| Number of plates washed = 16 | |

Example 3

This example involved an evaluation of foam stabilizers which include the disclosed polyalkoxylated amines and typical prior art foam boosters. This example is centered around a base formulation which includes the following constituents:

| Base Formulation | Weight % |
| --- | --- |
| Water | 60 |
| Dodecylbenzene Sulfonate, sodium salt | 22.5 |
| Lauryl (4 mol) ethoxyether sulfate, sodium salt | 7.5 |
| Ethyl Alcohol | 4 |
| Foam stabilizer | 6 |
| Foam Stabilizer | Number of Plates Washed |
| Polyethoxylated (5) isotridecyl oxypropylamine | 13 |
| Polyethoxylated (5) isotridecyl oxypropylamine/ coco diethanolamide (50:50) | 16 |
| Coco diethanolamide (100%) | 13 |
| Polyethoxylated (5) isotridecyl oxypropylamine/ polyethoxylated (5) isotridecylamine oxide (50:50) | 15 |
| Polyethoxylated (5) isotridecylamine oxide (100%) | 13 |
| Polyethoxylated (5) isotridecyloxypropylamine/ lauric myristic monoethanolamide (50:50) | 15 |
| Lauric myristic monoethanolamide (100%) | 14 |
| Polyethoxylated (5) isotridecyloxypropylamine/ coco amidopropyldimethyl amine oxide (50:50) | 15 |
| Coco amidopropyldimethyl amine oxide (100%) | 13 |
| Polyethoxylated (5) isotridecyloxypropylamine/ lauryl dimethyl amine oxide (50:50) | 15 |
| Lauryl dimethyl amine oxide (100%) | 13 |
| Polyethoxylated (5) isotridecyloxypropylamine/ coco amidopropyl betaine (50:50) | 14 |
| Coco amidopropyl betaine (100%) | 12 |

Example 4

An analysis of foam stabilizers which include blends of polyalkoxylated amines and a second constituent in varying ratios is included. Additionally, a plurality of prior art foam boosters is included for comparison. Finally, the listing of a commonly used, premium grade liquid dish detergent composition is evaluated to determine the number of plates washed so that comparison can be made. A standard formulation including the following was prepared:

| Base Formulation | Weight % |
| --- | --- |
| Water | 50 |
| Dodecylbenzene sulfonate, sodium salt | 20 |
| C12 Lauryl alcohol ether sulfate-4EO sodium salt | 15 |
| Sodium xylene sulfonate | 3 |
| Ethanol | 2 |
| Foam Stabilizer | 10 |

| Foam Stabilizer | Number of Plates Washed |
| --- | --- |
| Polyethoxylated (5) isodecyloxypropylamine (100%) | 17 |
| Polyethoxylated (5) isodecyloxypropylamine and isotridecyloxyethyl monoethanolamide (70:30) | 17 |
| Polyethoxylated (5) isodecyloxypropylamine and isotridecyloxyethyl monoethanolamide (50:50) | 17 |
| Polyethoxylated (5) isodecyloxypropylamine and isotridecyloxyethyl monoethanolamide (30:70) | 16 |
| Isotridecyloxyethyl monoethanolamide (100%) | 14 |
| Coco diethanolamide (100%) Prior Art | 14 |
| Lauric/myristic monoethanolamide (solid) Prior Art | 16 |
| No foam booster | 10 |
| Prior art Proctor & Gamble "Dawn" dish detergent composition | 17 |

Example 5

It has been found that alkane diols do not contribute to the performance of the inventive ethoxylated amine foam booster composition and are not required constituents of the invention. In fact, the presence of alkane diols in the inventive foam booster composition impairs the foam boosting properties of the composition.

A miniplate test according to ASTM Designation D 4009-81 was used to evaluate the effect of an alkane diol on the inventive compositions. The test was performed at a temperature of about 47° C. in water with a hardness of 150 ppm ($3Ca^{2+}/2Mg^{2+}$). Miniplates were soiled with 0.36 g soil/plate of commercial Crisco shortening. Each plate was washed for 45 seconds in a dish bath with a volume of 400 ml. The plates were continuously washed until 50% of the aqueous surface area of water in the bath was exposed (i.e. 50% of the water surface area was not covered by foam) which represents the end point of the test.

A base formulation was prepared and diluted with water to reach a concentration of 0.15 wt. %, on a formula basis. The base formulation was as follows:

| Base Formulation | Weight % |
| --- | --- |
| Isopropyl alcohol | 4.0 |
| Dodecylbenzene sulfonate, sodium salt (60%) | 40.0 |
| Lauryl (4-mole) ethoxyether sulfate, sodium salt (60%) | 12.6 |
| Foam stabilizer (E-C-15) | 0–6.0 |
| Alkane diol | 0–10 |
| Deionized water | Balance |

The foam stabilizer used in this example is polyethoxylated (15) coco amine which is designated by Tomah Products, Inc. as E-C-15. The same material is available from Akzo Nobel Chemicals, Inc. under the name Ethomeen C25. As shown in Table 1 below, the E-C-15 comprised from 0–6 weight percent of the base formulation. The base formulations of Table 1, examples 3–5 also included an alkane diol in the weight percent amounts shown.

As with the previous examples, the results of the performance evaluation are reported in terms of the number of plates each detergent composition washed. A single plate difference in the examples represents a significant difference in the data.

TABLE 1

| Ex. | Foam Stabilizer | Alkane Diol | Plates Washed |
| --- | --- | --- | --- |
| 1 | 0.0 wt. % Foam Stabilizer | 0.0 wt. % Alkane Diol | 10 |
| 2 | 6.0 wt. % E-C-15 | 0.0 wt. % Alkane Diol | 17 |
| 3 | 6.0 wt. % E-C-15 | 0.5 wt. % 1,2-dodecanediol | 15 |
| 4 | 6.0 wt. % E-C-15 | 1.5 wt. % 1,2-dodecanediol | 15 |
| 5 | 6.0 wt. % E-C-15 | 10 wt. % 1,2-dodecanediol | 16 |

A comparison of the number of plates washed in Table 1, examples 1 & 2, confirms that the ethoxylated amine foam booster is effective at improving the foam stability of the anionic surfactant-based hand dish detergents. Table 1, examples 3–5, demonstrate that the addition of 1,2-dodecanediol to the anionic ethoxylated amine dish composition decreased the foam stability of the inventive anionic ethoxylated amine detergent, demonstrating that the alkane diol does not contribute to the foam stability of the composition.

Referring next to Table 2 below, that table shows the results of other miniplate tests run to determine the foam stability of a composition including a base formulation of E-C-15 and varying amounts of alkane diol. As above, the miniplate test was run according to ASTM Designation D 4009-81. The test was performed at a temperature of about 47° C. in water with a hardness of 150 ppm ($3Ca^{2+}/2Mg^{2+}$). Miniplates were again soiled with 0.36 g soil/plate of commercial Crisco shortening. Each plate was again washed for 45 seconds in a dish bath with a volume of 400 ml. The plates were continuously washed until 50% of the aqueous surface area of water in the bath was exposed—representing the end point of the test.

The base formulation was prepared and diluted with water to reach a concentration of 0.15 wt. %, on a formula basis. The base formulation was as follows:

| Base Formulation | Weight % |
| --- | --- |
| E-C-15 | 5.0 |
| Alkane diol | 0–10 |
| Deionized water | Balance |

Table 2 reports the number of plates each base formulation washed before the foam completely dissipated.

TABLE 2

| Ex. | Alkane Diol | Plates Washed |
| --- | --- | --- |
| 6 | 0.0 wt. % 1,2-dodecanediol | 0 |
| 7 | 0.5 wt. % 1,2-dodecanediol | 0 |
| 8 | 1.5 wt. % 1,2-dodecanediol | 0 |
| 9 | 10 wt. % 1,2-dodecanediol | 0 |

The data of Table 2 show that a detergent consisting of an ethoxylated amine, E-C-15, and an alkane diol, has no foam stability in the miniplate test. The foam of these compositions broke completely upon attempting to wash the first soiled miniplate. These results may be due to the fact that food soils tend to defoam detergents. Moreover, the miniplate protocol introduces an increasing amount of food soil with each miniplate washed. These data suggest that it is invalid to attempt to determine the stability of a hand dish detergent foam booster without taking the impact of food soils into account.

Example 6

The primary skin irritancy of undiluted polyethoxylated (5) tertiary amine was evaluated by Hill Top Biolabs, Inc. in compliance with conditions specified by the US EPA and Organization for Economic Cooperation and Development (OECD) Guidelines.

DATA TABLE

| Polyoxyalkylated Tertiary Amines | TCL |
|---|---|
| Polyethoxylated (5) isodecyloxypropyl amine | 4 |
| Polyethoxylated (2) isodecyloxypropylamine | 1[a] |
| Polyethoxylated (2) coco amine | 2[a] |

[a]TCL data taken from Material Safety Data Sheets.

As previously outlined, the TCL label ranks irritancy on a scale of 1–4 with 1 being corrosive, 2 being severe irritant, 3 being moderate irritant and 4 being mild/slight irritant. These data are consistent with an objective of the invention which is to provide mild detergent compositions which neither irritate nor injure the user. Because the invention is intended for direct contact with the user's hands, strong acids, bases and other materials which cause irritation or injury are not compatible with the invention.

While the principles of this invention have been described in connection with specific embodiments, it should be understood clearly that these descriptions are made only by way of example and are not intended to limit the scope of the invention.

What is claimed:

1. A manually-applied detergent composition which is acceptable for dish washing applications, foams copiously in response to agitation, and exhibits time-extended foam characteristics, consisting essentially of:

about 10–50% by weight of a surfactant base consisting of surfactants selected from the group consisting of anionic surfactants, nonionic surfactants and mixtures thereof; and about 1–15% by weight of a foam stabilizer having the general structural formula:

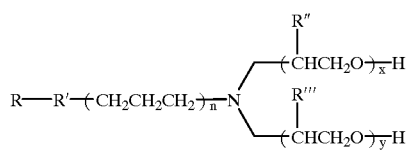

wherein

R is selected from the group consisting of (a) an alkyl group having between 4 and 22 carbon atoms, (b) a substituted aryloxy group having between 7 and 22 carbon atoms, and (c) an alkyloxy group having between 4 and 22 carbon atoms, R' has the general structural formula:

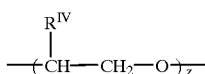

wherein $R^{IV}$ is selected from the group consisting of (a) hydrogen and (b) a methyl group, and z is an integer from 0–7, R" is selected from the group consisting of (a) hydrogen and (b) a methyl group, R'" is selected from the group consisting of (a) hydrogen and (b) a methyl group, n is 0 or 1, x is an integer from 1–20 and y is an integer from 1–20, such that x+y is greater than 3 but less than or equal to 20; and up to about 89% by weight of a diluent.

2. The detergent composition of claim 1 wherein the foam stabilizer constituent includes a second foam stabilizer constituent selected from the group consisting of polyalkoxylated amines, amine oxides, betaines, alkanolamides and sultaines.

3. The detergent composition of claim 1 wherein the foam stabilizer is about 3–10% by weight of the composition.

4. The detergent composition of claim 1 wherein the foam stabilizer is about 5–8% by weight of the composition.

5. The detergent composition of claim 1 wherein the composition further includes a hydrotrope.

6. In a manually-applied detergent composition which is acceptable for dish washing applications, foams copiously in response to agitation, and exhibits time-extended foam characteristics, the detergent composition consisting essentially of about 10–50% by weight of a surfactant base consisting of surfactants selected from the group consisting of anionic surfactants, nonionic surfactants and mixtures thereof, the improvement comprising:

the detergent composition further includes from about 1–15% by weight of a foam stabilizer consisting of a polyalkoxylated amine having the general structural formula:

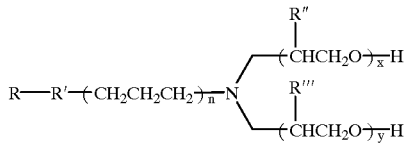

wherein

R is selected from the group consisting of (a) an alkyl group having between 4 and 22 carbon atoms, (b) a substituted aryloxy group having between 7 and 22 carbon atoms and (c) an alkyloxy group having between 4 and 22 carbon atoms, R' has the general structural formula:

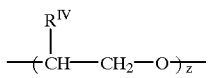

wherein $R^{IV}$ is selected from the group consisting of (a) hydrogen and (b) a methyl group, and z is an integer from 0–7, R" is selected from the group consisting of (a) hydrogen and (b) a methyl group, R'" is selected from the group consisting of (a) hydrogen and (b) a methyl group, n is 0 or 1, x is an integer from 1–20 and y is an integer from 1–20, such that x+y is greater than 3 but less than or equal to 20; and up to about 89% by weight of a diluent.

7. The detergent composition of claim 6 wherein the foam stabilizer is about 3–10% by weight of the composition.

8. The detergent composition of claim 6 wherein the foam stabilizer is about 5–8% by weight of the composition.

9. The detergent composition of claim 6 wherein the composition further includes a hydrotrope.

* * * * *